(12) United States Patent
Dehaghani et al.

(10) Patent No.: US 10,853,768 B2
(45) Date of Patent: Dec. 1, 2020

(54) BUSY DAY INFERENCE FOR USERS

(71) Applicant: Microsoft Technology Licensing, LLC, Redmond, WA (US)

(72) Inventors: Azar Rahimi Dehaghani, Seattle, WA (US); Michael Wascher, Seattle, WA (US); Nick Gedge, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 930 days.

(21) Appl. No.: 15/367,784

(22) Filed: Dec. 2, 2016

(65) Prior Publication Data

US 2018/0157979 A1    Jun. 7, 2018

(51) Int. Cl.
*G06N 5/04*      (2006.01)
*G06Q 10/10*      (2012.01)

(52) U.S. Cl.
CPC ........... *G06Q 10/1093* (2013.01); *G06N 5/04* (2013.01)

(58) Field of Classification Search
CPC ................................. G06Q 20/00; G06N 5/04
USPC .......................................................... 706/47
See application file for complete search history.

(56) References Cited

U.S. PATENT DOCUMENTS

| | | | |
|---|---|---|---|
| 7,233,933 B2 * | 6/2007 | Horvitz | G06Q 10/109 706/21 |
| 7,318,040 B2 | 1/2008 | Doss et al. | |
| 7,529,683 B2 | 5/2009 | Horvitz et al. | |
| 8,065,257 B2 | 11/2011 | Kuecuekyan | |
| 8,219,624 B2 * | 7/2012 | Haynes | G06Q 10/107 709/206 |
| 2002/0131565 A1 * | 9/2002 | Scheuring | G06Q 10/109 379/88.19 |
| 2007/0005406 A1 | 1/2007 | Assadian et al. | |
| 2011/0106736 A1 * | 5/2011 | Aharonson | G06Q 10/109 706/12 |
| 2011/0184768 A1 | 7/2011 | Norton et al. | |
| 2013/0305160 A1 | 11/2013 | Gingras et al. | |
| 2015/0095086 A1 * | 4/2015 | Gopinath | G06Q 10/1093 705/7.18 |

(Continued)

FOREIGN PATENT DOCUMENTS

WO     WO2015082253 A1     6/2015

OTHER PUBLICATIONS

Slope of Linear Functions, Mar. 12, 2015, www.columbia.edu/itc/sipa/math/slope_linear.html.*

(Continued)

*Primary Examiner* — Lut Wong
(74) *Attorney, Agent, or Firm* — Shook, Hardy and Bacon, L.L.P.

(57) ABSTRACT

An inference is made regarding whether or not an upcoming day is going to be a busy day for a user. One or more different user-specific event parameters are utilized to compute a user busyness score for the upcoming day, where these parameters are based in part on a history of events for the user and their past behavior. Then, whenever the user busyness score for the upcoming day is greater than a busy day threshold, it is inferred that the upcoming day is going to be a busy day for the user. Whenever the user busyness score for the upcoming day is less than a quiet day threshold, it is inferred that the upcoming day is going to be a quiet day for the user.

19 Claims, 8 Drawing Sheets

(56) References Cited

U.S. PATENT DOCUMENTS

2016/0104200 A1* 4/2016 Osotio ............... G06Q 30/0267
                   705/14.64
2017/0061389 A1* 3/2017 Naughton .......... G06Q 10/1095

OTHER PUBLICATIONS

Byun et al., "Utilizing context history to provide dynamic adaptations", Applied Artificial Intelligence, Aug. 16, 2010, pp. 533-548, vol. 18 2004—Issue 6, Taylor & Francis.

Horvitz et al., "Learning and Reasoning about Interruption", Fifth International Conference on Multimodal Interfaces (ICMI'03), Nov. 5-7, 2003, pp. 9, Association for Computing Machinery (ACM).

Moreno et al., "Assigning Work Items more efficiently by detecting participants' busyness and predicting workload using Business Intelligence tools", ResearchGate, Jan. 2010, pp. 13, ResearchGate.

Yorke-Smith et al., "Like an Intuitive and Courteous Butler: A Proactive Personal Agent for Task Management", Proceedings of 8th International Conference on Autonomous Agents and Multiagent Systems (AAMAS 2009), May 10-15, 2009, pp. 8, International Foundation for Autonomous Agents and Multiagent Systems (www.ifaamas.org).

Zhang, "An intelligent system for contextual notifications solution", Degree Project in Electrical Engineering, Second Cycle, May 26, 2016, pp. 60, KTH Royal Institute of Technology School of Electrical Engineering.

* cited by examiner

BUSY DAY INFERENCE FOR USERS

BACKGROUND

The Internet is a global data communications system that serves billions of people across the globe and provides them access to a vast array of online information resources and services including those provided by the World Wide Web and intranet-based enterprises. Thanks to the ubiquity of the Internet and the wide variety of network-enabled end-user computing devices that exist today, many of which are mobile computing devices, people today spend a large and ever-increasing amount of time online (e.g., using various types of end-user computing devices that are configured to operate over a data communication network such as the Internet, among other types of networks). For example, many people today schedule the various upcoming events in their life (e.g., their professional and personal meetings and appointments) and manage their calendars that keep track of these events using an electronic (e.g., computer-based and thus software-based) calendar application (also known as an online calendar). Many people today also create and maintain electronic to-do lists that include reminders of tasks and actions to be completed. Many people today also heavily rely on electronic messages to communicate with each other in both a professional and a personal context. In other words, many people today routinely have conversations by sending electronic messages to each other over a data communication network. As such, for many people today their end-user computing devices have become an indispensable tool for managing the many different facets of their professional and personal lives.

SUMMARY

Busy day inference technique implementations described herein generally infer whether or not an upcoming day is going to be a busy day for a user. In an exemplary implementation one or more different user-specific event parameters are utilized to compute a user busyness score for the upcoming day, where these parameters are based in part on a history of events for the user and their past behavior. Then, whenever the user busyness score for the upcoming day is greater than a busy day threshold, it is inferred that the upcoming day is going to be a busy day for the user. Additionally, whenever the user busyness score for the upcoming day is less than a quiet day threshold, it is inferred that the upcoming day is going to be a quiet day for the user.

It should be noted that the foregoing Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter. Its sole purpose is to present some concepts of the claimed subject matter in a simplified form as a prelude to the more-detailed description that is presented below.

DESCRIPTION OF THE DRAWINGS

The specific features, aspects, and advantages of the busy day inference technique implementations described herein will become better understood with regard to the following description, appended claims, and accompanying drawings where:

DETAILED DESCRIPTION

Figure 1:
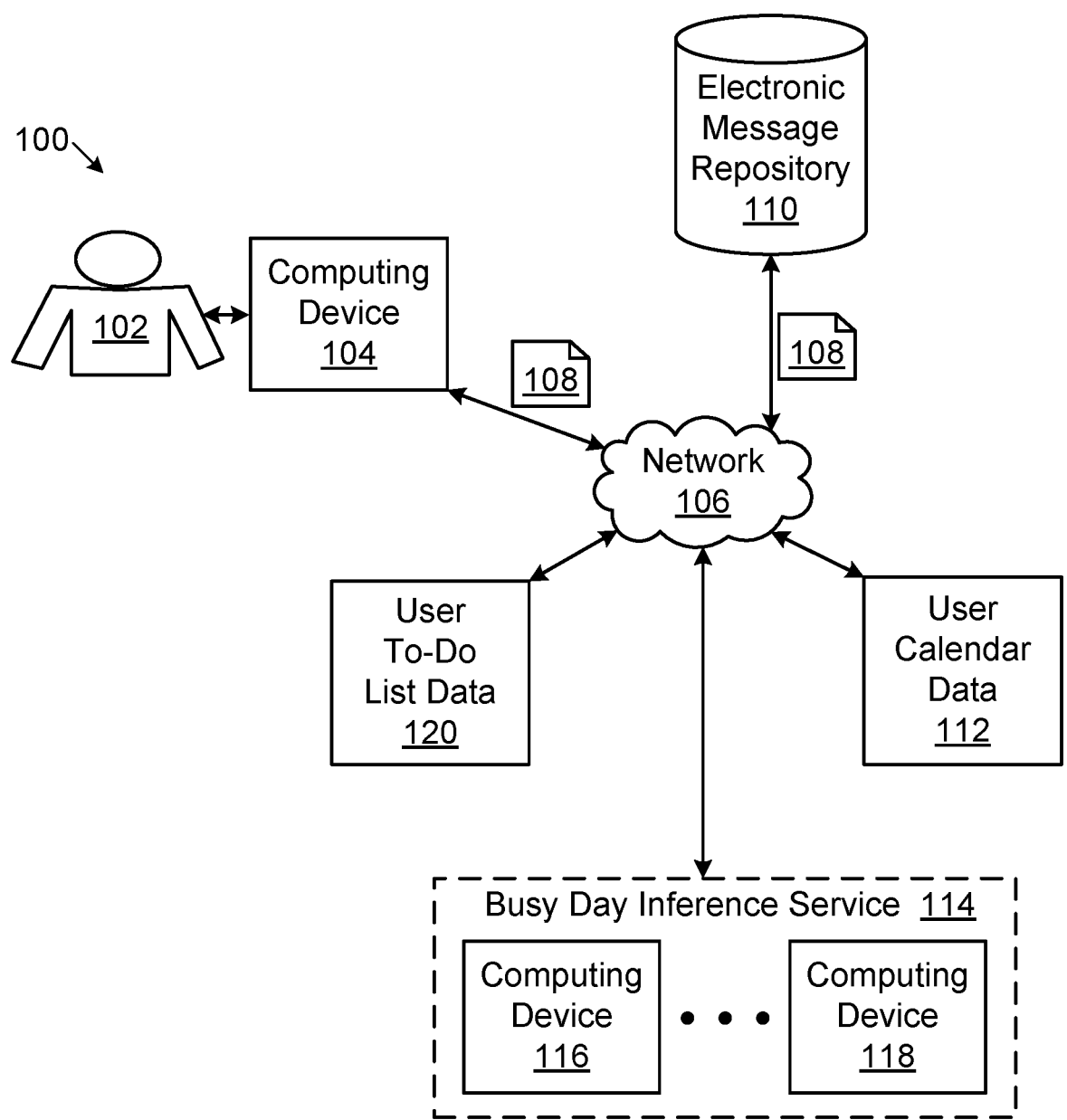
FIG. 1 is a diagram illustrating one implementation, in simplified form, of a system framework for realizing the busy day inference technique implementations described herein.

In the following description of busy day inference technique implementations reference is made to the accompanying drawings which form a part hereof, and in which are shown, by way of illustration, specific implementations in which the busy day inference technique can be practiced. It is understood that other implementations can be utilized and structural changes can be made without departing from the scope of the busy day inference technique implementations.

It is also noted that for the sake of clarity specific terminology will be resorted to in describing the busy day inference technique implementations described herein and it is not intended for these implementations to be limited to the specific terms so chosen. Furthermore, it is to be understood that each specific term includes all its technical equivalents that operate in a broadly similar manner to achieve a similar purpose. Reference herein to "one implementation", or "another implementation", or an "exemplary implementation", or an "alternate implementation", or "one version", or "another version", or an "exemplary version", or an "alternate version", or "one variant", or "another variant", or an "exemplary variant", or an "alternate variant" means that a particular feature, a particular structure, or particular characteristics described in connection with the implementation/version/variant can be included in at least one implementation of the busy day inference technique. The appearances of the phrases "in one implementation", "in another implementation", "in an exemplary implementation", "in an alternate implementation", "in one version", "in another version", "in an exemplary version", "in an alternate version", "in one variant", "in another variant", "in an exemplary variant", and "in an alternate variant" in various places in the specification are not necessarily all referring to the same implementation/version/variant, nor are separate or alternative implementations/versions/variants mutually exclusive of other implementations/versions/variants. Yet furthermore, the order of process flow representing one or more implementations, or versions, or variants of the busy day inference technique does not inherently indicate any particular order nor imply any limitations of the busy day inference technique.

As utilized herein, the terms "component," "system," "client" and the like are intended to refer to a computer-related entity, either hardware, software (e.g., in execution), firmware, or a combination thereof. For example, a component can be a process running on a processor, an object, an executable, a program, a function, a library, a subroutine, a computer, or a combination of software and hardware. By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, to the extent that the terms "includes," "including," "has," "contains," variants thereof, and other similar words are used in either this detailed description or the claims, these terms are intended to be inclusive, in a manner similar to the term "comprising", as an open transition word without precluding any additional or other elements.

1.0 Busy Day Inference for Users

The busy day inference technique implementations described herein generally automatically infer (e.g., predict) whether or not an upcoming day is going to be a busy day for a user. More particularly and as will be appreciated from the more-detailed description that follows, the busy day inference technique implementations operate to establish an historical understanding of the user's schedule and the associated past events and actions that the user has been involved in, and then use this historical understanding to infer how busy the user's upcoming day is going to be. The term "upcoming day" is used herein to refer to a new day that the user is about to begin or the user's next day. For example, in the case where the current time and date is 9:00 PM on Saturday, July 16 the upcoming day would be Sunday, July 17. In the case where the current time and date is 6:00 AM on Monday, July 18 the upcoming day would be Monday, July 18. The term "user" is used herein to refer to a person who is using the busy day inference technique implementations.

The busy day inference technique implementations described herein are advantageous for various reasons including, but not limited to, the following. As will be appreciated from the foregoing and the more-detailed description that follows, the busy day inference technique implementations help the user stay on top of, prepare for, and thus avoid surprises in their upcoming day. The busy day inference technique implementations also increase the user's efficiency and productivity. For example, since the busy day inference technique implementations automatically infer whether or not the user's upcoming day is going to be a busy day for the user, the busy day inference technique implementations eliminate the time and effort the user would otherwise have to expend to make this inference. In other words, the busy day inference technique implementations eliminate the need for the user to have to manually evaluate their calendar (or calendars in the case where the user has a plurality of different calendars), and manually evaluate their to-do list (or to-do lists in the case where the user has a plurality of different to-do lists), and manually evaluate the electronic messages they have sent and received in order to determine if their upcoming day is going to be a busy day for them. In the case where the busy day inference technique implementations infer that the user's upcoming day is going to be a busy day for the user, these implementations also allow the user to plan ahead by rescheduling (e.g., postponing) any low priority events that are currently scheduled for their upcoming day. In the case where the busy day inference technique implementations infer that the user's upcoming day is going to be a quiet (e.g., not busy) day for the user, these implementations also allow the user to plan ahead by using open time in their upcoming day to work on one or more tasks that they are currently assigned to complete. The busy day inference technique implementations also result in the user being more confident about their upcoming day.

Additionally, the busy day inference technique implementations described herein are operable with any type of end-user computing device, examples of which are described in more detail hereafter. The busy day inference technique implementations may also be employed by a wide variety of computing (e.g., software-based) applications that can be run (e.g., executed) on a given end-user computing device that is utilized by the user—for convenience sake such computing applications are hereafter simply referred to as applications. For example, the busy day inference technique may be employed by any type of intelligent personal assistant application (e.g., CORTANA® (a registered trademark of Microsoft Corporation) or SIRI® (a registered trademark of Apple Inc.), or the like), any type of electronic (e.g., computer-based and thus software-based) personal information management application, any type of electronic calendar application, any type of electronic task tracking and management application, any type of personal productivity application, any type of chat application, any type of electronic messaging application, any type of video conferencing application, and any other type of application that may provide the user with one or more types of insights into their upcoming day.

FIG. 1 illustrates one implementation, in simplified form, of a system framework for realizing the busy day inference technique implementations described herein. As exemplified in FIG. 1 the system framework 100 includes an end-user computing device 104 that is configured to communicate various types of information over a conventional data communication network 106 (herein also referred to as a computer network) such as the Internet (among other types of conventional data communication networks)—examples of such information are described in more detail hereafter. The computing device 104 can be any type of conventional mobile computing device such as a smartphone, or a tablet computer, or a laptop computer (sometimes also referred to as a notebook or netbook computer), or a computing device that is integrated into an automobile (e.g., a car, or a truck, or any other type of motorized vehicle), among other types of conventional mobile computing devices. As is appreciated in the art of mobile computing devices, in the case where the computing device 104 is a mobile computing device it will often include Global Positioning System (GPS) receiver technology and/or other geolocation technologies that can be used to identify and track the current geolocation (i.e., geographic location) of the computing device 104 and thus a user 102 who is carrying and utilizing it, and thus can also be used to determine the user's daily commute routine (e.g., the number of commutes that are made by the user each day of each week, the duration of each of these commutes, and the cumulative duration of these commutes). The computing device 104 can also be any type of conventional non-mobile computing device such as a desktop personal computer (PC), or a video game console, among other types of conventional non-mobile computing devices.

Referring again to FIG. 1, the end-user computing device 104 is utilized by the user 102 to perform a wide variety of tasks. By way of example but not limitation, the user 102 may utilize the computing device 104 to receive a notification that the upcoming day is going to be a busy day for them, or receive another notification that the upcoming day is going to be a quiet day for them. The user 102 may also utilize the computing device 104 to create and maintain one or more electronic to-do lists that include reminders of tasks and actions to be completed. More particularly, these to-do lists may include reminders of one or more pending (e.g., not yet completed) tasks that the user is assigned to complete (e.g., is responsible for completing), or reminders of one or more pending tasks that one or more other people are assigned to complete for the user, or reminders of one or more upcoming events that the user is scheduled to attend, or any combination of the just-described different types of reminders. It will be appreciated that the user's 102 to-do list data may be stored locally on the computing device 104. The user's to-do list data 120 may also be stored in the cloud.

Referring again to FIG. 1, the user 102 may also schedule the various upcoming events in their life (e.g., their professional and personal meetings and appointments) and may manage their calendar(s) that keeps track of these events using a conventional electronic calendar application (not shown, hereafter simply referred to as a calendar application) that runs on the end-user computing device 104, where this calendar application may include a conventional electronic personal information management application that supports electronic calendars. In the case where the user 102 has a plurality of different calendars, each of these different calendars may be associated with a different context of the user's life (e.g., the user may have one or more personal calendars, and one or more work calendars, among other types of calendars). The term "meeting" is used herein to refer to any type of upcoming scheduled event that involves a plurality of users. In other words, a meeting is an upcoming assembly or conference of a plurality of users for a specific purpose. As such, a given meeting would generally appear in the calendars for a plurality of users. In contrast to the term "meeting," the term "appointment" is used herein to refer to any type of upcoming scheduled event that involves just a single user. As such, a given appointment would generally appear in the calendar for just a single user. As is appreciated in the art of electronic calendaring, various conventional calendar applications exist today which vie for popularity. While some of today's calendar applications may store the user's 102 calendar data locally on the computing device 104, many of today's calendar applications are web-based (e.g., they store the user's calendar data 112 in the cloud). Today's calendar applications may also provide a variety of other features such as allowing the user's calendar data 112 to be synchronized across each of the other end-user computing devices (not shown) that the user 102 may utilize. Today's calendar applications may also allow the user's calendar data 112 to be shared with other people (not shown), and to be synchronized with these other people's calendars. Many of today's calendar applications support a conventional open protocol that can be used to access the user's calendar data 112 via the data communication network 106.

As described heretofore, many people today heavily rely on electronic messages to communicate with each other in both a professional and a personal context. In the course of this communication via electronic messages one or more tasks are often discussed between a plurality of people and the responsibility for completing a given task is often assigned to one or more of the people who are involved in this discussion. For example, the user may receive an electronic message from another person, where in this message the other person makes a request of the user (e.g., the other person may ask the user to perform a specific task). The user may also send an electronic message to another person, where in this message the user makes a request of the other person (e.g., the user may ask the other person to perform a specific task). The user may also send an electronic message to another person, where in this message the user offers to complete a specific task for the other person. The user may also receive an electronic message from another person, where in this message the other person offers to complete a specific task for the user. As is appreciated in the art of electronic messaging over data communication networks, people today routinely exchange various types of electronic messages with each other including, but not limited to, email (also known as electronic mail and e-mail) messages, instant text messages (also known as SMS (Short Message Service) messages), instant multimedia messages (also known as MMS (Multimedia Messaging Service) messages), online chat messages (also known as instant messaging (IM), among other things), recorded voice messages (e.g., recorded phone calls and the like), recorded video messages (e.g., recorded video calls and the like), blog postings on the World Wide Web (herein sometimes simply referred to as the web), user postings on social networking websites, and fax (also known as facsimile or telefax) messages.

Referring again to FIG. 1, the user 102 may also utilize the end-user computing device 104 to send electronic messages 108 to, and receive electronic messages 108 from, other people over the data communication network 106. These messages 108 that are sent and received by the user 102 may be stored locally on the computing device 104, and may also be stored in an electronic message repository 110 that resides in the cloud. The busy day inference technique implementations described herein support the communication of any type of electronic message 108 between the user 102 and other people. By way of example but not limitation, in one implementation of the busy day inference technique described herein the electronic messages 108 that are sent and received by the user 102 include one or more email messages which may include one or more email threads. As is appreciated in the art of email messaging, an email thread is an email message that includes a chronologically-ordered concatenation of an original email message and each of the succeeding replies thereto. Accordingly, an email thread provides a chronologically-ordered record of an email-based conversation that takes place between a plurality of people. In another implementation the electronic messages 108 may include one or more instant text messages, or one or more instant multimedia messages, or one or more online chat messages. In another implementation the messages 108 may include one or more recorded voice messages that have been converted to text using a conventional speech-to-text (also known as voice-to-text) conversion method, or one or more recorded video messages having audio that has been converted to text using the speech-to-text conversion method. In another implementation the messages 108 may include one or more web-based (e.g., online) blog postings, or one or more user postings on one or more social networking websites. In another implementation the messages 108 may include one or more fax messages that have been converted to text using a conventional optical character recognition method. In another implementation the messages 108 may include any combination of the just-described different types of electronic messages.

Referring again to FIG. 1, the end-user computing device 104, the electronic message repository 110, the user's calendar data 112, and the user's to-do list data 120 are also configured to communicate over the data communication network 106 with a busy day inference service 114 that runs on one or more other computing devices 116/118. These other computing devices 116/118 can also communicate with each other via the network 106. In an exemplary implementation of the busy day inference technique described herein the other computing devices 116/118 are located in the cloud so that the busy day inference service 114 operates as a cloud service and the network 106 includes wide area network functionality. The term "cloud service" is used herein to refer to a web application that operates in the cloud and can be hosted on (e.g., deployed at) a plurality of data centers that can be located in different geographic regions (e.g., different regions of the world).

Referring again to FIG. 1 and as will be described in more detail hereafter, the busy day inference service 114 generally performs a variety of functions associated with inferring whether or not an upcoming day is going to be a busy day for the user 102. By way of example but not limitation, in an exemplary implementation of the busy day inference technique described herein the busy day inference service 114 utilizes one or more different user-specific event parameters to compute a user busyness score for the upcoming day, where these parameters are based in part on the user's history (e.g., their past events and behavior). Then, whenever the user busyness score for the upcoming day is greater than a busy day threshold it is inferred that the upcoming day is going to be a busy day for the user, and whenever this user busyness score is less than a quiet day threshold it is inferred that the upcoming day is going to be a quiet day for the user. Exemplary types of user-specific event parameters that may be utilized to compute the user busyness score for the upcoming day are described in more detail hereafter. As will also be described in more detail hereafter, each of the different user-specific event parameters is derived using conventional methods from one or more different types of user data including, but not limited to, the user's calendar data 112, the user's to-do list data 120, the user's electronic messages 108, and the data originating from the aforementioned GPS receiver technology and/or other geolocation technologies.

Figure 2:
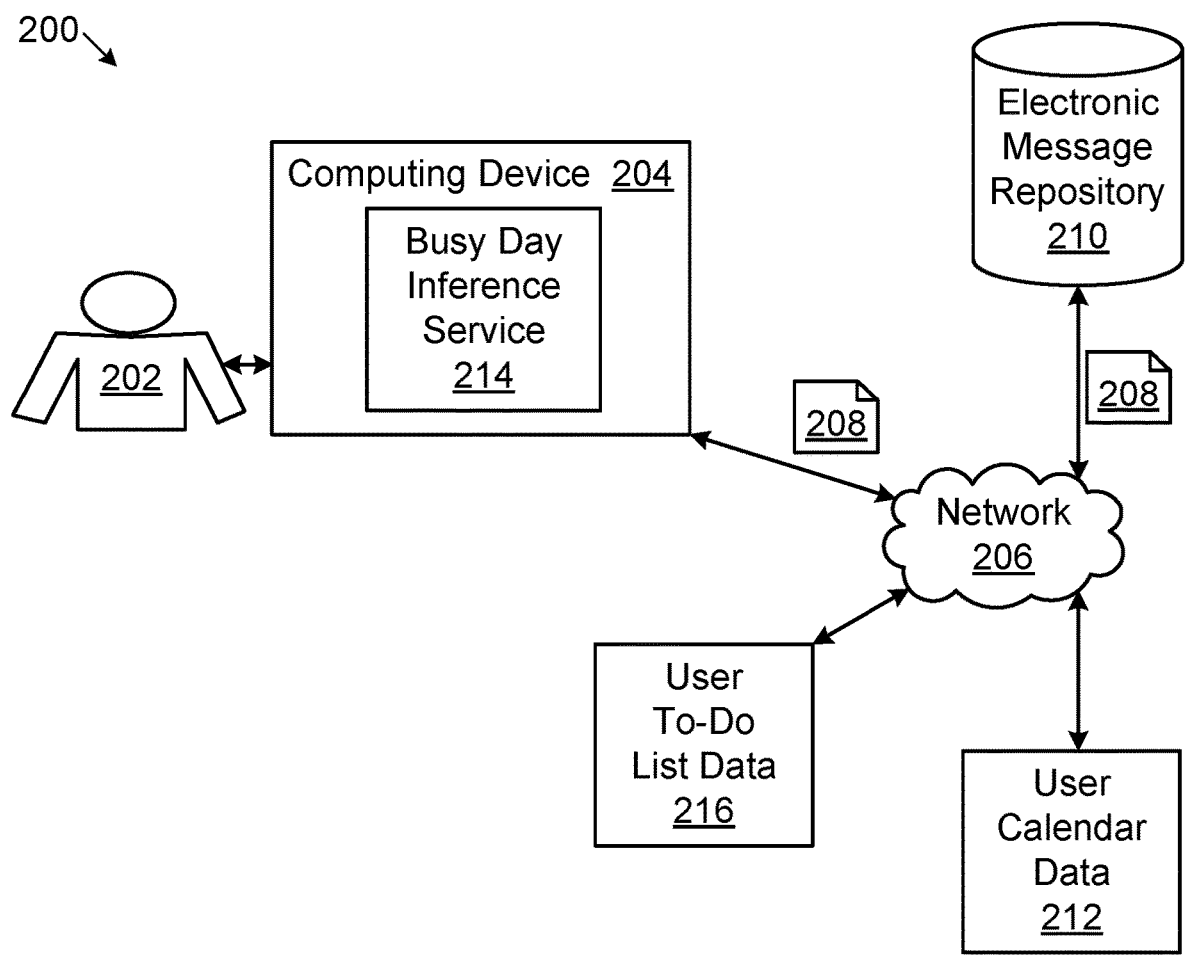
FIG. 2 is a diagram illustrating another implementation, in simplified form, of a system framework for realizing the busy day inference technique implementations described herein.

FIG. 2 illustrates another implementation, in simplified form, of a system framework for realizing the busy day inference technique implementations described herein. As exemplified in FIG. 2 the system framework 200 includes the aforementioned end-user computing device 204 that is configured to communicate various types of information over the aforementioned data communication network 206, and is utilized by a user 202 to perform the aforementioned wide variety of tasks. For example, the user 202 may utilize the computing device 204 to create and maintain the aforementioned one or more electronic to-do lists, where the user's 202 to-do list data may be stored locally on the computing device 204, and the user's to-do list data 216 may also be stored in the cloud. The user 202 may also schedule the various upcoming events in their life and manage their calendar(s) that keeps track of these events using the aforementioned calendar application (not shown) that runs on the computing device 204, where this calendar application may store the user's 202 calendar data locally on the computing device 204, and may also store the user's calendar data 212 in the cloud. The user 202 may also utilize the computing device 204 to send electronic messages 208 to, and receive electronic messages 208 from, other people over the network 206. These messages 208 may be stored locally on the computing device 204, and may also be stored in the aforementioned electronic message repository 210 that resides in the cloud. The system framework 200 also includes a busy day inference service 214 that runs on the computing device 204 and performs the various functions described herein that are associated with inferring whether or not an upcoming day is going to be a busy day for the user 202.

Figure 3:
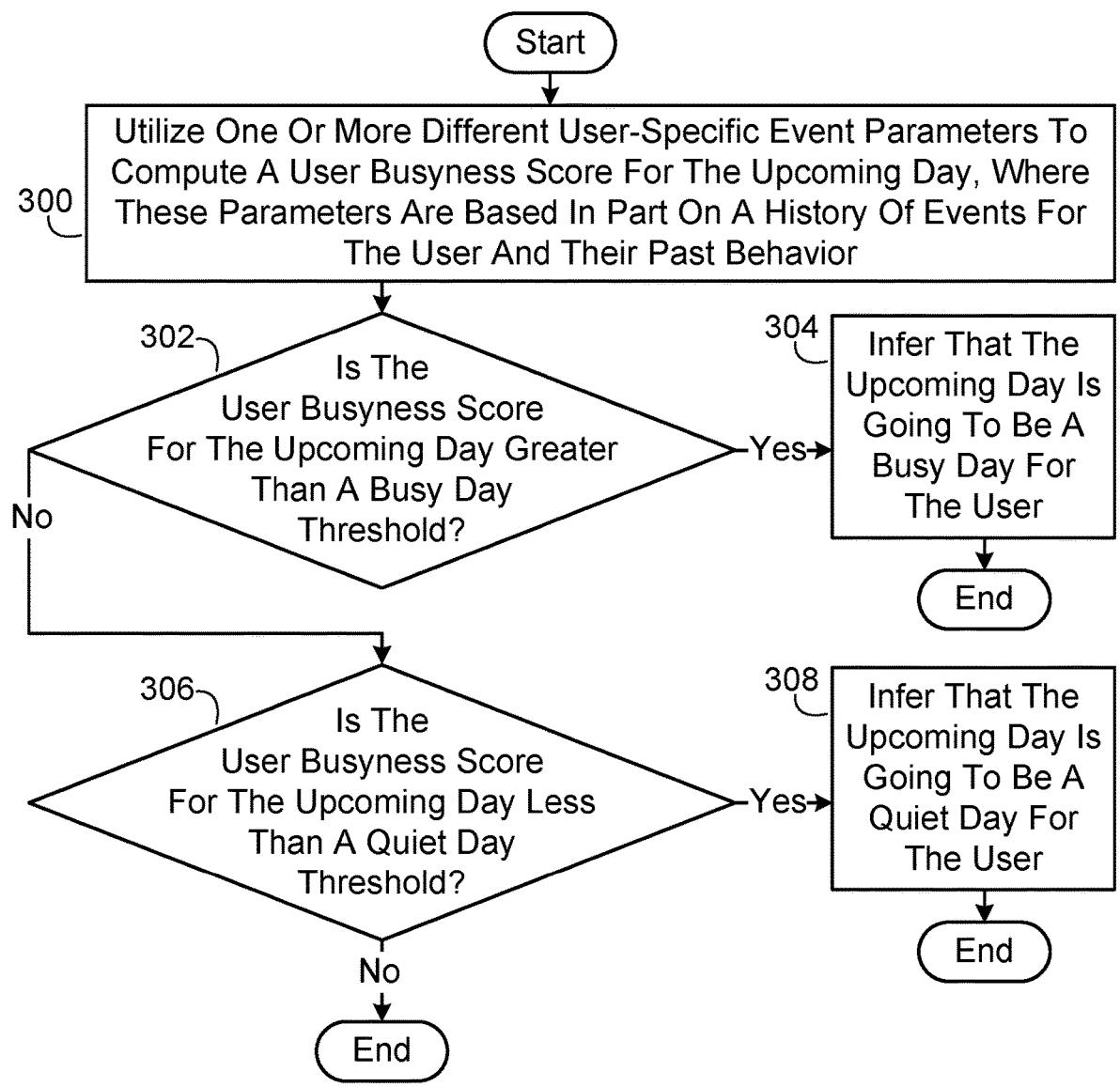
FIG. 3 is a flow diagram illustrating an exemplary implementation, in simplified form, of a process for inferring whether or not an upcoming day is going to be a busy day for a user.

FIG. 3 illustrates an exemplary implementation, in simplified form, of a process for inferring whether or not an upcoming day is going to be a busy day for a user. In one implementation of the busy day inference technique described herein the process illustrated in FIG. 3 is realized on the system framework 100 illustrated in FIG. 1. In another implementation of the busy day inference technique the process illustrated in FIG. 3 is realized on the system framework 200 illustrated in FIG. 2. As exemplified in FIG. 3 the process starts with utilizing one or more different user-specific event parameters to compute a user busyness score for the upcoming day, where these parameters are based in part on the user's history (e.g., a history of events for the user and their past behavior) (process action 300). Then, whenever the user busyness score for the upcoming day is greater than a busy day threshold (process action 302, Yes), it is inferred that the upcoming day is going to be a busy day for the user (process action 304). Whenever the user busyness score for the upcoming day is less than a quiet day threshold (process action 306, Yes), it is inferred that the upcoming day is going to be a quiet day for the user (process action 308). As will be appreciated from the more-detailed description that follows, the user busyness score that is computed in action 300 provides a measure of how busy the user is going to be during their upcoming day. More particularly, a high user busyness score indicates that the user is going to be very busy during their upcoming day, whereas a low user busyness score indicates that the user is not going to be very busy during their upcoming day.

Referring again to FIG. 3, the busy day inference technique implementations described herein keep an historical record of each of the user busyness scores that is computed in action 300 along with the particular day and date that the user busyness score corresponds to. In one implementation of the busy day inference technique described herein the busy day threshold has a prescribed busy day value and the quiet day threshold has a prescribed quiet day value. In an alternate implementation of the busy day inference technique the busy day threshold is user-specific and is dynamically determined based on various factors including, but not limited to, the history of events for the user, the user's past behavior, and the historical record of past user busyness scores that were computed for the user. In another alternate implementation of the busy day inference technique the quiet day threshold is also user-specific and is also dynamically determined based on various factors including, but not limited to, the history of events for the user, the user's past behavior, and the historical record of past user busyness scores that were computed for the user. The just-described alternate implementations are advantageous for various reasons such as the following. Consider a situation where the upcoming day is a Wednesday, a first user has an average of just one meeting scheduled on Wednesdays, and a second user has an average of seven meetings scheduled on Wednesdays. In the case where there are three meetings scheduled for the first user on the upcoming day, the just-described alternate implementations would likely infer that the upcoming day is going to be a busy day for the first user. However, in the case where there are three meetings scheduled for the second user on the upcoming day, the just-described alternate implementations would likely not infer that the upcoming day is going to be a busy day for the second user, but rather would likely infer that the upcoming day is going to be a quiet day for the second user.

Referring again to FIGS. 1-3, the just-described action of inferring that the upcoming day is going to be a busy day for the user 102/202 (action 304) may include notifying the user 102/202 that the upcoming day is going to be a busy day for them. Similarly, the just-described action of inferring that the upcoming day is going to be a quiet day for the user 102/202 (action 308) may include notifying the user 102/202 that the upcoming day is going to be a quiet day for them. It will be appreciated that these user notifications can be implemented using a wide variety of user notification methods such as displaying a message on the display screen of the user's 102/202 computing device 104/204, or sending an instant text message to the user 102/202, or the like. Given the foregoing, it will also be appreciated that the combination of actions 300/302/304 and the just-described busy day user notification has the advantageous effect of increasing the user's efficiency and productivity. The combination of actions 300/306/308 and the just-described quiet day user notification also has the advantageous effect of increasing the user's efficiency and productivity.

The inference that the upcoming day is going to be busy day for the user can be advantageously utilized to produce a variety of user experiences. For example and referring again to FIG. 3, whenever it is inferred that the upcoming day is going to be a busy day for the user (action 304), a list of possible busy day actions can be presented to the user and they may select a desired one of these actions that they want to perform. Exemplary busy day actions that may be included in this list are rescheduling a meeting that is currently scheduled for the upcoming day, and setting aside (e.g., blocking out) time to prepare for this meeting. Similarly, the inference that the upcoming day is going to be quiet day for the user can also be advantageously utilized to produce a variety of user experiences. For example, whenever it is inferred that the upcoming day is going to be a quiet day for the user (action 308), a list of possible quiet day actions can be presented to the user and they may select a desired one of these actions that they want to perform. Exemplary quiet day actions that may be included in this list are scheduling a pending task the user is assigned to complete for a time slot that is currently available in the upcoming day, scheduling some personal time for the upcoming day, and moving a meeting that is currently scheduled for another day in the future to a time slot that is currently available in the upcoming day.

Referring again to FIGS. 1-3, it is noted that the busy day inference technique implementations described herein can utilize various types of user-specific event parameters to compute the user busyness score for the upcoming day (action 300). These different user-specific event parameters can generally be classified into two categories, namely explicit user-specific event parameters and inferred user-specific event parameters. In an exemplary implementation of the busy day inference technique described herein the explicit user-specific event parameters may include the number of meetings that either were or are scheduled for the user 102/202 on a specific day of a specific week, which may be determined from the user's calendar data 112/212 (among the other types of user data described herein) using conventional methods. The explicit user-specific event parameters may also include the cumulative (e.g., aggregate) duration of these meetings, which may also be determined from the user's calendar data 112/212 (among the other types of user data described herein) using conventional methods. The explicit user-specific event parameters may also include the number of reminders that exist for the user 102/202 on the specific day of the specific week, which may be determined from the user's to-do list data 120/216 (among the other types of user data described herein) using conventional methods.

Referring again to FIGS. 1 and 2, in an exemplary implementation of the busy day inference technique described herein the inferred user-specific event parameters may include the number of pending tasks the user 102/202 is assigned to complete on the specific day of the specific week, which may be inferred from any of the different types of user data described herein using conventional methods. The inferred user-specific event parameters may also include the number of commutes that either have been made or are expected to be made by the user 102/202 on the specific day of the specific week, and the cumulative duration of these commutes. The cumulative duration of the commutes that either have been made or are expected to be made by the user 102/202 is hereafter sometimes simply referred to as the duration of commutes parameter. Generally speaking, these number and duration of commutes parameters may be inferred using a conventional commutes determination method that analyzes historical commute data for the user 102/202 which is generated by the aforementioned GPS receiver technology and/or other geolocation technologies that may be included in the end-user computing device 104/204, and also analyzes the user's calendar data 112/212 for the upcoming day. More particularly and by way of a simplified example, assume that the upcoming day is a Thursday. The commutes determination method can determine values for the number and duration of commutes parameters for past Thursdays by analyzing the historical commute data for the user. The commutes determination method can determine values for the number and duration of commutes parameters for the upcoming day as follows. The commutes determination method can analyze the historical commute data for the user to determine the number and duration of commutes for the user's typical commute routine on Thursdays (e.g., the commutes determination method can determine that on past Thursdays the user on average left home at 7:45 AM, arrived at work at 8:15 AM, left work at 5:15 PM, and arrived back at home at 5:45 PM). The commutes determination method can also determine the number and duration of any additional commutes the user is expected to make in the upcoming day by analyzing the user's calendar data for the upcoming day and identifying any specific events that are scheduled for the user on the upcoming day and involve a commute. For example, the commutes determination method can determine that the user has a dentist appointment at a known geographic location scheduled in their calendar for 2:00 PM to 3:00 PM on the upcoming day. The commutes determination method can then infer that the user will commute from work to this appointment, and then from this appointment back to work, and can utilized a conventional traffic conditions website to predict the expected duration of these two appointment-related commutes. The commutes determination method can then infer the values for the number and duration of commutes parameters for the upcoming day to be a summation of the number and duration of commutes for the user's typical commute routine on Thursdays and the number and duration of the additional commutes the user is expected to make in the upcoming day.

Figure 4:
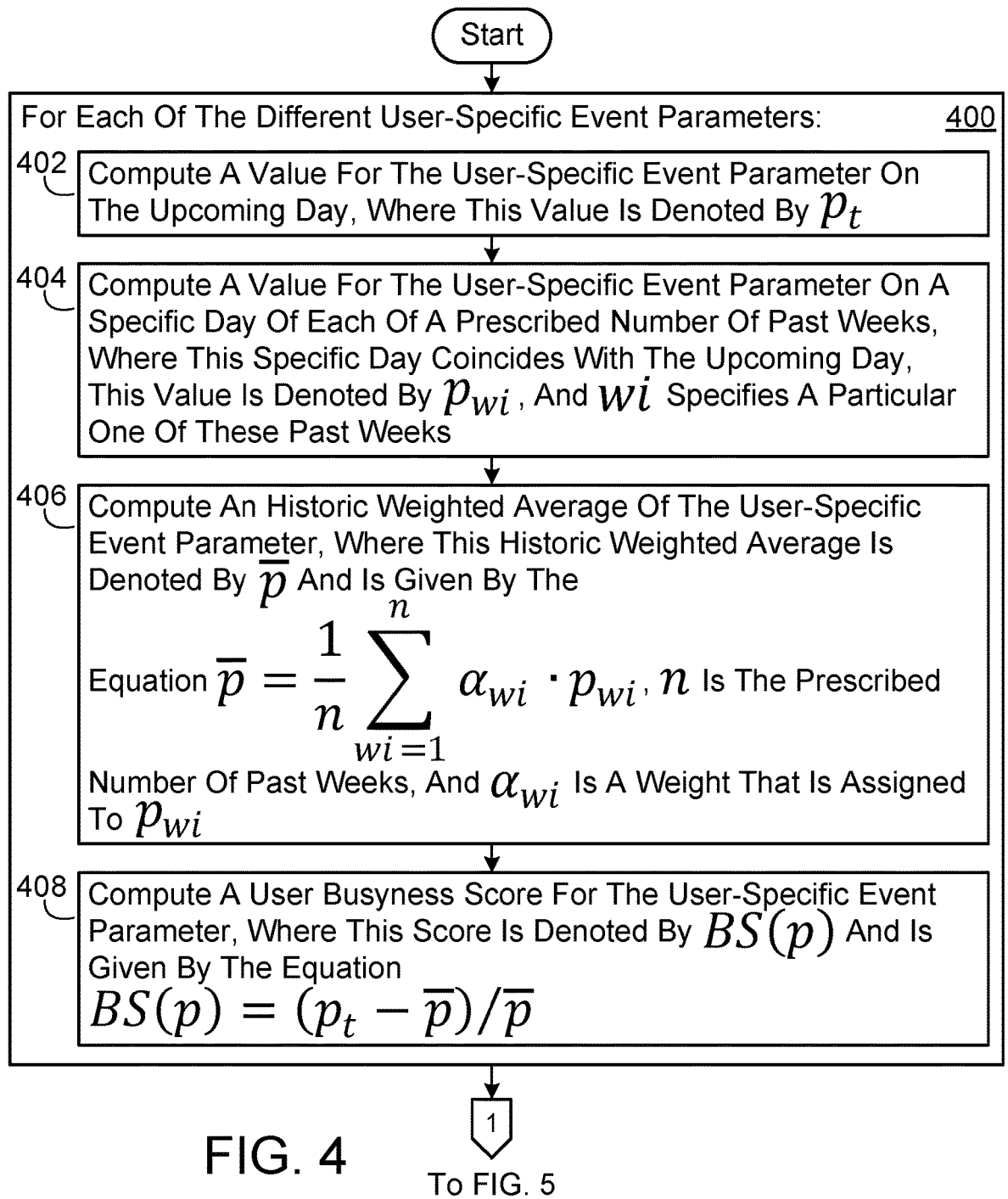
FIGS. 4 and 5 are a flow diagram illustrating an exemplary implementation, in simplified form, of a process for utilizing one or more different user-specific event parameters to compute a user busyness score for the upcoming day.
Figure 5:
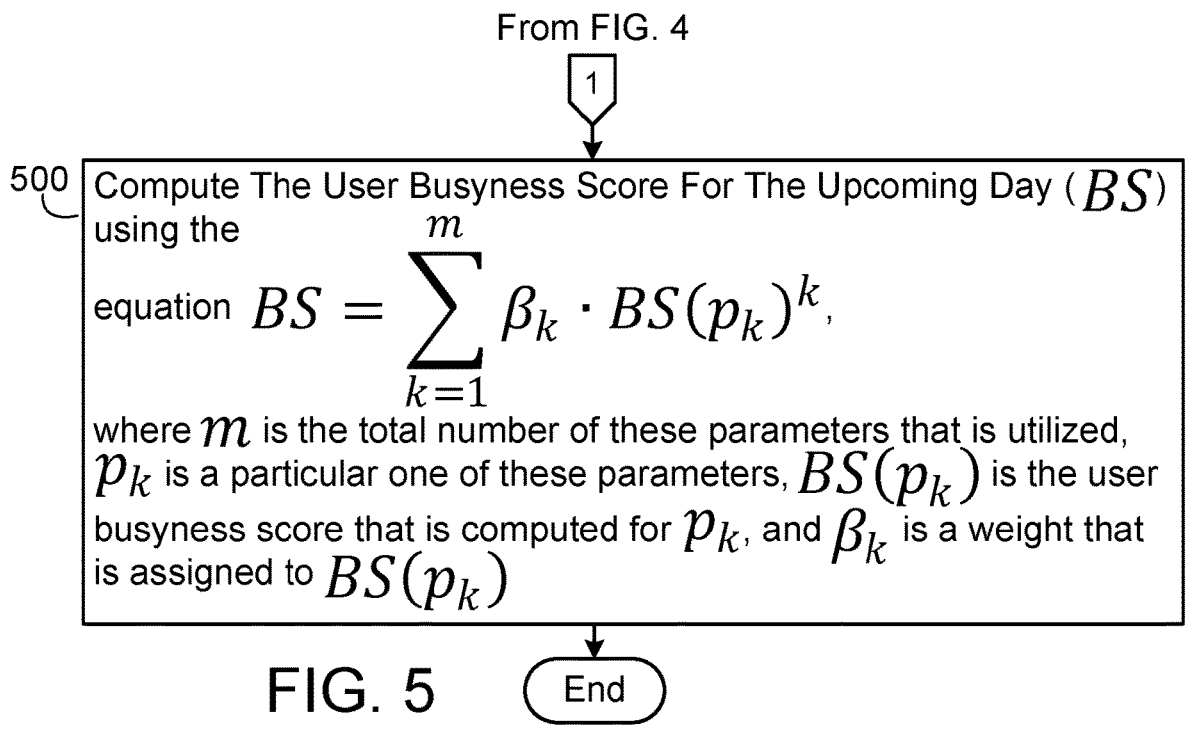

FIGS. 4 and 5 illustrate an exemplary implementation, in simplified form, of a process for utilizing one or more different user-specific event parameters to compute a user busyness score for the upcoming day which is denoted by BS, where these parameters are based in part on the user's history. In other words, FIGS. 4 and 5 illustrate an exemplary implementation of the action 300 that is shown in FIG. 3. The process shown in FIGS. 4 and 5 is based on the intuition that the upcoming day coincides with a specific day of the week (e.g., the upcoming day is either a Monday, or a Tuesday, or a Wednesday, or a Thursday, or a Friday, or a Saturday, or a Sunday). As exemplified in FIG. 4 the process starts with the following actions being performed for each of the different user-specific event parameters (process action 400). A value for the user-specific event parameter on the upcoming day is computed, where this value is denoted by $p_t$ (process action 402). A value for the user-specific event parameter on the just-described specific day of each of a prescribed number of past weeks is then computed, where this value is denoted by $p_{wi}$, and wi specifies a particular one of these past weeks (process action 404). In other words and as will be appreciated from the more-detailed description that follows, given that the upcoming day is a Tuesday, and given that the variable p denotes a particular one of the different user-specific event parameters, $p_1$ denotes the value of p on Tuesday one week ago, $p_2$ denotes the value of p on Tuesday two weeks ago, $p_3$ denotes the value of p on Tuesday three weeks ago, and so on. An historic weighted average of the user-specific event parameter is then computed, where this historic weighted average is denoted by $\bar{p}$ and is given by the equation $$\bar{p} = \frac{1}{n} \sum_{wi=1}^{n} \alpha_{wi} \cdot p_{wi},$$

n is the prescribed number of past weeks (e.g., $1 \leq wi \leq n$), and $\alpha_{wi}$ is a weight that is assigned to $p_{wi}$ (process action 406). A user busyness score for the user-specific event parameter is then computed, where this score is denoted by BS(p) and is given by the equation $BS(p)=(p_t-\bar{p})/\bar{p}$. It will be appreciated that this equation for BS (p) operates to compare the value for the parameter p that was computed on the upcoming day ($p_t$) to the historic weighted average of the parameter p that was computed over the n past weeks ($\bar{p}$).

As exemplified in FIG. 5 and referring again to FIG. 4, after actions 402, 404, 406 and 408 have been completed for each of the different user-specific event parameters, the user busyness score for the upcoming day (BS) is computed using the equation $BS=\sum_{k=1}^{m} \beta_k \cdot BS(p_k)$, where m is the total number of these parameters that is utilized, $p_k$ is a particular one of these parameters, BS ($p_k$) is the user busyness score that is computed for $p_k$, and $\beta_k$ is a weight that is assigned to $BS(p_k)$. It will be appreciated that $\beta_k$ specifies the contribution of $p_k$ to BS (in other words, $\beta_k$ specifies the importance of $p_k$).

It is noted that the value of the weights $\beta_k$ which are assigned to the user busyness scores BS ($p_k$) that are computed for each of the different user-specific event parameters $p_k$, where $1 \leq k \leq m$, can be determined in various ways. In an exemplary implementation of the busy day inference technique described herein $\beta_k$ is initialized to a generic value, and the value of $\beta_k$ is subsequently adjusted (e.g., fine-tuned) over time based upon explicit feedback that is received from the user. By way of example but not limitation, in one version of the just-described implementation the generic value is 1/m for $1 \leq k \leq m$ so that each of the different user-specific event parameters $p_k$ contributes equally to BS. In another version the generic value is based upon an analysis of the history of events for the user and their past behavior. For example, in the case where the user is employed as a truck driver the user will on average spend many hours a day commuting so the weight that is assigned to the user busyness score that is computed for the duration of commutes parameter will have a low value since this parameter is not a very good indicator of the comparative busyness of the user's day. In the case where the user is employed as a scientist or engineer who generally works in an office each day and thus generally just commutes to and from the office and maybe sometimes to lunch or to run an errand, the weight that is assigned to the user busyness score that is computed for the duration of commutes parameter may have a high value since this parameter is a good indicator of the comparative busyness of the user's day. In yet another version the generic value is based upon a study that asks one or more users to rank each of the different user-specific event parameters with regard to how good a busyness indicator the parameter is in comparison to the other ones of these parameters (e.g., the users are asked to rank the degree to which each of the different user-specific event parameters contributes to the user's busyness in a given day)—as such, the generic value reflects what is understood about an average user in a general population of users.

Regarding the aforementioned explicit feedback which is received from the user, it is noted that after the user receives a notification that the upcoming day is going to be a busy day for them, and after they have completed this supposed busy day, they may choose to provide positive feedback indicating that the day was indeed a busy day for them. The user may also choose to provide negative feedback indicating that in reality the day was not a busy day for them. The busy day inference technique implementations described herein will store this positive or negative feedback. It will be appreciated that the user may also provide the just-described positive and negative feedback before they have completed the supposed busy day.

Similarly, after the user receives a notification that the upcoming day is going to be a quiet day for them, and after they have completed this supposed quiet day, they may choose to provide positive feedback indicating that the day was indeed a quiet day for them. The user may also choose to provide negative feedback indicating that in reality the day was not a quiet day for them. The busy day inference technique implementations described herein will store this positive or negative feedback. In the case where negative feedback is received from the user the busy day inference technique implementations will utilize this feedback to analyze the weights $\alpha_{wi}$ which are assigned to the parameters $p_{wi}$, and the weights $\beta_k$ which are assigned to the user busyness scores $BS(p_k)$, and will adjust these weights accordingly—this dynamic weights adjustment feature advantageously allows the busy day inference technique implementations to dynamically adapt to the user's preferences and personalize the user busyness score computation. It will be appreciated that the user may also provide the just-described positive and negative feedback before they have completed the supposed quiet day.

It is also noted that n can generally have any value that is greater than or equal to one. However, the following tradeoff exists in selecting the value of n. Generally speaking, the smaller the value of n the faster the computation of a value for each of the different user-specific event parameters on the specific day of each of the n past weeks (and thus the smaller the computing resources that are consumed to perform this computation), but the lower the accuracy of the user busyness score that is computed for the upcoming day. The larger the value of n the slower the computation of a value for each of the different user-specific event parameters on the specific day of each of the n past weeks (and thus the larger the computing resources that are consumed to perform this computation), but the higher the accuracy of the user busyness score that is computed for the upcoming day. In a tested implementation of the busy day inference technique described herein the value of n was nine, which ensures efficient adaptation to changes in the user's behavior over time and thus results in a user busyness score for the upcoming day that is reasonably accurate, without consuming an excessive amount of computing resources.

It is also noted that the value of the weights $\alpha_{wi}$ which are assigned to the parameters $p_{wi}$, where $1 \leq wi \leq n$, can be determined in various ways. By way of example but not limitation, in one implementation of the busy day inference technique described herein $\alpha_{wi}$ is initialized to a value that is defined by a prescribed function that generally decreases this value as wi increases. In other words, the prescribed function results in the weight $\alpha_1$ that is assigned to $p_1$ being greater than the weight $\alpha_2$ that is assigned to $p_2$, and the weight $\alpha_2$ being greater than the weight $\alpha_3$ that is assigned to $p_3$, and so on such that $\alpha_1 > \alpha_2 > \ldots > \alpha_n$. This weight distribution scheme ensures that the more recent the occurrence of p the higher its contribution to $\bar{p}$, thus ensuring efficient reaction to changes in the user's behavior over time. In one version of the just-described implementation the prescribed function is a linear function having a negative slope. In another version the prescribed function is an exponentially decreasing function.

In one implementation of the busy day inference technique described herein a common set of weights $\{\alpha_1, \alpha_2, \ldots, \alpha_n\}$ is assigned to each of the different user-specific event parameters. In another implementation of the busy day inference technique the common set of weights is assigned to some of the different user-specific event parameters, and one or more other sets of weights are assigned to others of these parameters. In yet another implementation of the busy day inference technique a different set of weights is assigned to each of the different user-specific event parameters.

Figure 6:
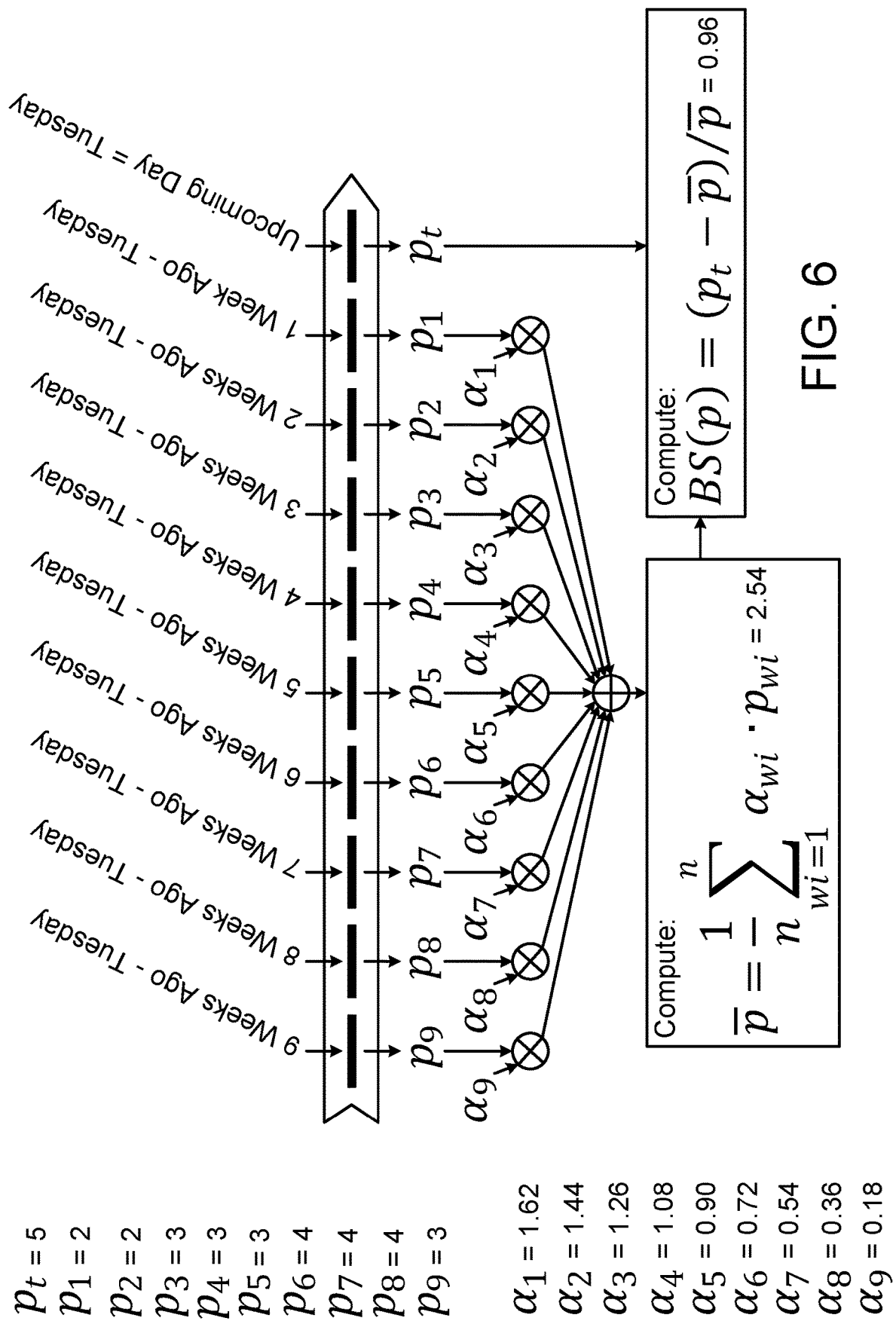
FIG. 6 is a diagram illustrating an exemplary implementation, in simplified form, of how the user busyness score for the upcoming day is computed for a particular one of the user-specific event parameters, namely the number of meetings scheduled for the user.

FIG. 6 illustrates an exemplary implementation, in simplified form, of how the user busyness score for the upcoming day is computed for a particular one of the user-specific event parameters, namely the number of meetings scheduled for the user. As exemplified in FIG. 6, the value of n is nine, the upcoming day is a Tuesday, the user has five meetings scheduled on the upcoming day, the user had two meetings scheduled on the Tuesday of one week ago and the value of the weight that is applied thereto is 1.62, the user had two meetings scheduled on the Tuesday of two weeks ago and the value of the weight that is applied thereto is 1.44, the user had three meetings scheduled on the Tuesday of three weeks ago and the value of the weight that is applied thereto is 1.26, the user had three meetings scheduled on the Tuesday of four weeks ago and the value of the weight that is applied thereto is 1.08, the user had three meetings scheduled on the Tuesday of five weeks ago and the value of the weight that is applied thereto is 0.90, the user had four meetings scheduled on the Tuesday of six weeks ago and the value of the weight that is applied thereto is 0.72, the user had four meetings scheduled on the Tuesday of seven weeks ago and the value of the weight that is applied thereto is 0.54, the user had four meetings scheduled on the Tuesday of eight weeks ago and the value of the weight that is applied thereto is 0.36, and the user had three meetings scheduled on the Tuesday of nine weeks ago and the value of the weight that is applied thereto is 0.18. Accordingly, the value of the historic weighted average of the number of meetings scheduled for the user on Tuesdays is 2.54, and the value of the user busyness score for the number of meetings scheduled for the user on the upcoming Tuesday is 0.96.

Figure 7:
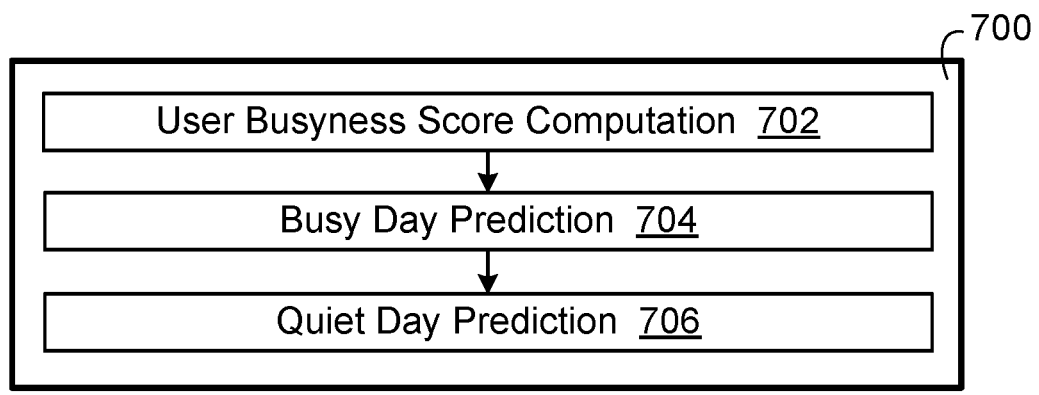
FIG. 7 is a diagram illustrating an exemplary implementation, in simplified form, of a busy day inferrer computer program.

FIG. 7 illustrates an exemplary implementation, in simplified form, of a busy day inferrer computer program. As exemplified in FIG. 7 and referring again to FIG. 3, the busy day inferrer computer program 700 includes, but is not limited to, a user busyness score computation sub-program 702 that performs action 300, a busy day prediction sub-program 704 that performs actions 302 and 304, and a quiet day prediction sub-program 706 that performs actions 306 and 308. Each of the just-described sub-programs is realized on a computing device such as that which is described in more detail in the Exemplary Operating Environments section which follows. More particularly and by way of example but not limitation, and referring again to FIGS. 1 and 2, in one implementation of the busy day inference technique described herein the just-described sub-programs may be realized on the computing devices 116/118. In another implementation of the busy day inference technique the just-described sub-programs may be realized on the end-user computing device 204.

2.0 Other Implementations

While the busy day inference technique has been described by specific reference to implementations thereof, it is understood that variations and modifications thereof can be made without departing from the true spirit and scope of the busy day inference technique. It is noted that any or all of the implementations that are described in the present document and any or all of the implementations that are illustrated in the accompanying drawings may be used and thus claimed in any combination desired to form additional hybrid implementations. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of the appended claims.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the foregoing implementations include a system as well as a computer-readable storage media having computer-executable instructions for performing the acts and/or events of the various methods of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned systems have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchical components).

Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

3.0 Exemplary Operating Environments

Figure 8:
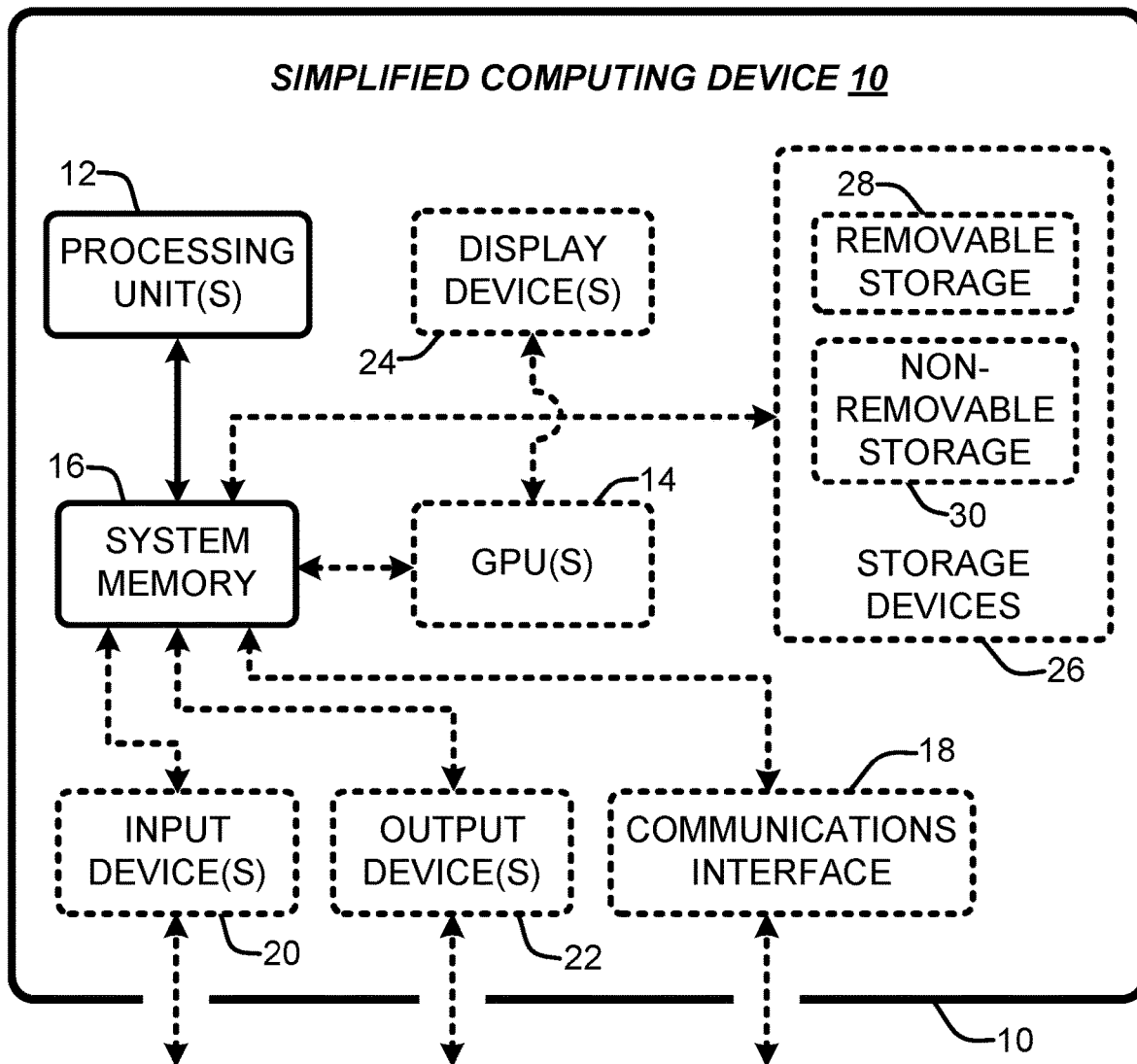
FIG. 8 is a diagram illustrating a simplified example of a general-purpose computer system on which various implementations and elements of the busy day inference technique, as described herein, may be realized.

The busy day inference technique implementations described herein are operational within numerous types of general purpose or special purpose computing system environments or configurations. FIG. 8 illustrates a simplified example of a general-purpose computer system on which various implementations and elements of the busy day inference technique, as described herein, may be implemented. It is noted that any boxes that are represented by broken or dashed lines in the simplified computing device 10 shown in FIG. 8 represent alternate implementations of the simplified computing device. As described below, any or all of these alternate implementations may be used in combination with other alternate implementations that are described throughout this document. The simplified computing device 10 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to realize the busy day inference technique implementations described herein, the device should have a sufficient computational capability and system memory to enable basic computational operations. In particular, the computational capability of the simplified computing device 10 shown in FIG. 8 is generally illustrated by one or more processing unit(s) 12, and may also include one or more graphics processing units (GPUs) 14, either or both in communication with system memory 16. Note that that the processing unit(s) 12 of the simplified computing device 10 may be specialized microprocessors (such as a digital signal processor (DSP), a very long instruction word (VLIW) processor, a field-programmable gate array (FPGA), or other micro-controller) or can be conventional central processing units (CPUs) having one or more processing cores.

In addition, the simplified computing device 10 may also include other components, such as, for example, a communications interface 18. The simplified computing device 10 may also include one or more conventional computer input devices 20 (e.g., touchscreens, touch-sensitive surfaces, pointing devices, keyboards, audio input devices, voice or speech-based input and control devices, video input devices, haptic input devices, devices for receiving wired or wireless data transmissions, and the like) or any combination of such devices.

Similarly, various interactions with the simplified computing device 10 and with any other component or feature of the busy day inference technique implementations described herein, including input, output, control, feedback, and response to one or more users or other devices or systems associated with the busy day inference technique implementations, are enabled by a variety of Natural User Interface (NUI) scenarios. The NUI techniques and scenarios enabled by the busy day inference technique implementations include, but are not limited to, interface technologies that allow one or more users user to interact with the busy day inference technique implementations in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other sensors (e.g., speech and/or voice recognition). Such NUI implementations are also enabled by the use of various techniques including, but not limited to, information derived from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices. Further examples of such NUI implementations include, but are not limited to, NUI information derived from touch and stylus recognition, gesture recognition (both onscreen and adjacent to the screen or display surface), air or contact-based gestures, user touch (on various surfaces, objects or other users), hover-based inputs or actions, and the like. Such NUI implementations may also include, but are not limited, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the busy day inference technique implementations described herein.

However, it should be understood that the aforementioned exemplary NUI scenarios may be further augmented by combining the use of artificial constraints or additional signals with any combination of NUI inputs. Such artificial constraints or additional signals may be imposed or generated by input devices such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the busy day inference technique implementations described herein.

The simplified computing device 10 may also include other optional components such as one or more conventional computer output devices 22 (e.g., display device(s) 24, audio output devices, video output devices, devices for transmitting wired or wireless data transmissions, and the like). Note that typical communications interfaces 18, input devices 20, output devices 22, and storage devices 26 for general-purpose computers are well known to those skilled in the art, and will not be described in detail herein.

The simplified computing device 10 shown in FIG. 8 may also include a variety of computer-readable media. Computer-readable media can be any available media that can be accessed by the computer 10 via storage devices 26, and can include both volatile and nonvolatile media that is either removable 28 and/or non-removable 30, for storage of information such as computer-readable or computer-executable instructions, data structures, programs, sub-programs, or other data. Computer-readable media includes computer storage media and communication media. Computer storage media refers to tangible computer-readable or machine-readable media or storage devices such as digital versatile disks (DVDs), blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, programs, sub-programs, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, sub-programs, and/or computer program products embodying some or all of the various busy day inference technique implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

The busy day inference technique implementations described herein may be further described in the general context of computer-executable instructions, such as programs, sub-programs, being executed by a computing device. Generally, sub-programs include routines, programs, objects, components, data structures, and the like, that perform particular tasks or implement particular abstract data types. The busy day inference technique implementations may also be practiced in distributed computing environments where tasks are performed by one or more remote processing devices, or within a cloud of one or more devices, that are linked through one or more communications networks. In a distributed computing environment, sub-programs may be located in both local and remote computer storage media including media storage devices. Additionally, the aforementioned instructions may be implemented, in part or in whole, as hardware logic circuits, which may or may not include a processor.

Alternatively, or in addition, the functionality described herein can be performed, at least in part, by one or more hardware logic components. For example, and without limitation, illustrative types of hardware logic components that can be used include FPGAs, application-specific integrated circuits (ASICs), application-specific standard products (ASSPs), system-on-a-chip systems (SOCs), complex programmable logic devices (CPLDs), and so on.

Wherefore, what is claimed is:

1. A system for inferring whether or not an upcoming day is going to be a busy day for a user, the system comprising:
a busy day inferrer comprising one or more computing devices, said one or more computing devices being in communication with each other via a computer network whenever there is a plurality of computing devices, and a computer program having a plurality of sub-programs executable by said one or more computing devices, wherein the plurality of sub-programs configure said one or more computing devices to:
utilize one or more different user-specific event parameters to compute a user busyness score for the upcoming day, said user-specific event parameters being based in part on a history of events for the user and their past behavior;
if the user busyness score for the upcoming day is greater than a busy day threshold, infer that the upcoming day is going to be busy for the user;
output a notification to the user to notify the user whether the upcoming day is going to be busy; and
present to the user one or more busy day actions when the upcoming day is going to be busy.

2. The system of claim 1, wherein said user-specific event parameters comprise one or more of:
- one or more explicit user-specific event parameters; or
- one or more inferred user-specific event parameters.

3. The system of claim 2, wherein the one or more explicit user-specific event parameters comprises one or more of:
- a number of meetings scheduled for the user on a specific day of a specific week; or
- a cumulative duration of said meetings; or
- a number of reminders existing for the user on the specific day of the specific week.

4. The system of claim 2, wherein the one or more inferred user-specific event parameters comprises one or more of:
- a number of pending tasks the user is assigned to complete on a specific day of a specific week; or
- a number of commutes made by the user on the specific day of the specific week; or
- a cumulative duration of said commutes.

5. The system of claim 1, wherein the upcoming day coincides with a specific day of a week and a sub-program for utilizing the one or more different user-specific event parameters to compute the user busyness score for the upcoming day comprises sub-programs for:
- for each of said user-specific event parameters,
  - computing a first value for the user-specific event parameter on the upcoming day,
  - computing a second value for the user-specific event parameter on said specific day of each of a prescribed number of past weeks,
  - computing an historic weighted average of the user-specific event parameter over the prescribed number of past weeks, and
  - using the first value for the user-specific event parameter on the upcoming day and the historic weighted average of the user-specific event parameter over the prescribed number of past weeks to compute a parameter-related user busyness score for the user-specific event parameter, and
- using a weighted combination of parameter-related user busyness scores that are computed for said user-specific event parameters to compute the user busyness score for the upcoming day.

6. The system of claim 5, wherein the prescribed number of past weeks is nine.

7. The system of claim 5, wherein the weight applied to each user-specific event parameter to compute the historic weighted average is initialized to a value defined by a prescribed function that decreases over the prescribed number of past weeks.

8. The system of claim 7, wherein the prescribed function comprises one of:
- a linear function having a negative slope; or
- an exponentially decreasing function.

9. The system of claim 5, wherein the weight applied to each parameter-related user busyness score is initialized to a generic value which is subsequently adjusted over time based upon explicit feedback that is received from the user.

10. The system of claim 9, wherein the generic value is computed as one divided by a total number of said user-specific event parameters that are utilized.

11. The system of claim 9, wherein the generic value is based upon one of:
- an analysis of the history of events for the user and their past behavior; or
- a study that asks one or more users to, for each user-specific event parameter, rank the user-specific event parameter with regard to how good a busyness indicator the user-specific event parameter is in comparison to other user-specific event parameters.

12. The system of claim 1, wherein the busy day threshold is dynamically determined based on factors comprising the history of events for the user, their past behavior, and past user busyness scores that were computed for the user.

13. The system of claim 1, wherein the plurality of sub-programs further configure said one or more computing devices to, whenever the user busyness score for the upcoming day is less than a quiet day threshold, infer that the upcoming day is going to be quiet for the user.

14. The system of claim 13, wherein the quiet day threshold is dynamically determined based on factors comprising the history of events for the user, their past behavior, and past user busyness scores that were computed for the user.

15. The system of claim 13, wherein a sub-program for inferring that the upcoming day is going to be quiet for the user is configured to notify the user that the upcoming day is going to be quiet.

16. A system for inferring whether or not an upcoming day is going to be a busy day for a user, the system comprising:
- a busy day inferrer comprising a computing device that is utilized by the user, and a computer program having a plurality of sub-programs executable by said computing device, wherein the plurality of sub-programs configure said computing device to:
  - utilize one or more different user-specific event parameters to compute a user busyness score for the upcoming day, said user-specific event parameters being based in part on a history of events for the user and their past behavior;
  - whenever the user busyness score for the upcoming day is greater than a busy day threshold, infer that the upcoming day is going to be busy for the user;
  - output a notification to the user to notify the user whether the upcoming day is going to be busy; and
  - present to the user one or more busy day actions when the upcoming day is going to be busy.

17. The system of claim 16, wherein said user-specific event parameters comprise one or more of:
- a number of meetings scheduled for the user on a specific day of a specific week; or
- a cumulative duration of said meetings; or
- a number of reminders existing for the user on the specific day of the specific week; or
- a number of pending tasks the user is assigned to complete on the specific day of the specific week; or
- a number of commutes made by the user on the specific day of the specific week; or
- a cumulative duration of said commutes.

18. The system of claim 16, wherein the upcoming day coincides with a specific day of a week and a sub-program for utilizing the one or more different user-specific event parameters to compute the user busyness score for the upcoming day comprises sub-programs for:
- for each of said user-specific event parameters,
  - computing a first value for the user-specific event parameter on the upcoming day,
  - computing a second value for the user-specific event parameter on said specific day of each of a prescribed number of past weeks,
  - computing an historic weighted average of the user-specific event parameter over the prescribed number of past weeks, and using the first value for the user-specific event parameter on the upcoming day and the historic weighted average of the user-specific event parameter over the prescribed number of past weeks to compute a parameter-related user busyness score for the user-specific event parameter; and using a weighted combination of parameter-related user busyness scores that are computed for said user-specific event parameters to compute the user busyness score for the upcoming day.

19. A computer-implemented process for inferring whether or not an upcoming day is going to be a busy day for a user, the computer-implemented process comprising:

utilizing one or more different user-specific event parameters to compute a user busyness score for the upcoming day, said user-specific event parameters being based in part on a history of events for the user and their past behavior;

whenever the user busyness score for the upcoming day is greater than a busy day threshold, inferring that the upcoming day is going to be busy for the user;

outputting a notification to the user to notify the user whether the upcoming day is going to be busy; and presenting to the user one or more busy day actions when the upcoming day is going to be busy.

* * * * *